Patented Oct. 30, 1928.

1,690,075

UNITED STATES PATENT OFFICE.

CHARLES A. KRAUS AND CONRAD C. CALLIS, OF WORCESTER, MASSACHUSETTS, ASSIGNORS TO STANDARD OIL DEVELOPMENT COMPANY, A CORPORATION OF DELAWARE.

PROCESS OF ALKYLATION.

No Drawing. Application filed April 5, 1923. Serial No. 630,091.

This invention relates to processes of alkylation, and will be fully understood from the following description.

It has been proposed heretofore to conduct alkylation by preparing a reagent through the action of alkyl iodids in ether on magnesium and then using this reagent, commonly known as the Grignard reagent, upon halids of the element or compound to be alkylated. This process, however, is not satisfactory on a technical scale and is of high cost, etc.

In proceeding in accordance with the present invention, we introduce into a suitable container magnesium, ether, and the desired amount of an alkyl chlorid, for example ethyl chlorid, and the substance to be alkylated. By way of illustration, the substance to be alkylated may be plumbous chlorid for the preparation of lead tetraethyl. Where using the lower-boiling alkyl chlorids the container should be capable of being tightly closed and resistant to high pressures. Suitable temperature-regulating means, as a jacket or coils should also be present.

With ethyl chlorid the temperature is maintained for instance in the neighborhood of 40° C. At such temperature reaction takes place readily between the alkyl chlorid and the magnesium and the plumbous chlorid. When reaction is complete, heat may be applied and the ether and the lead tetraethyl product be distilled off. It is well known that lead tetraethyl is decomposable by heat and care should be taken to avoid this in the distillation. Or the ether may be distilled off at suitable temperature, and then steam may be introduced. The lead tetraethyl is carried over with the steam and condensed. Or, instead of recovering the end product by distillation, after the reaction is complete the container may be cooled and water may be introduced and the mixture may then be extracted with a solvent for the lead tetraethyl product.

If desired, instead of introducing the substance to be alkylated at the same time as the magnesium and the alkyl chlorid, the reaction may be carried out by two separated stages, magnesium being first reacted upon with an alkyl chlorid in ether, the temperature being maintained around 50° C. for example in a closed container, and then after cooling down, the reaction mass may be used with the substance to be alkylated, the temperature being suitably maintained for reaction.

It seems probable that the reaction is expressed by the following equation:

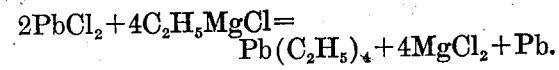

$$2PbCl_2 + 4C_2H_5MgCl = Pb(C_2H_5)_4 + 4MgCl_2 + Pb.$$

Instead of ethyl chlorid, as mentioned, other alkyl chlorids may be used.

What we claim is:

1. The improvement in the art of alkylating lead for the preparation of lead tetraethyl, which comprises subjecting plumbous chlorid to the action of magnesium and ethyl chlorid in ether, without preliminary formation of ethyl magnesium chlorid maintaining the temperature around 40° C., and finally removing the lead tetraethyl by steam.

2. The improvement in the art of alkylating lead for the preparation of lead tetraethyl, which comprises subjecting plumbous chlorid to the action of magnesium and ethyl chlorid in ether, and maintaining the temperature above the normal boiling point of the ethyl chlorid.

3. The improvement in the art of alkylation, which comprises heating the substance to be alkylated with magnesium and an alkyl chlorid, at a temperature above the normal boiling point of the alkyl chlorid.

4. The improvement in the art of alkylating lead for the preparation of lead tetraethyl, which comprises simultaneously reacting ethyl chlorid in ether solution with magnesium and lead chlorid, and recovering the lead tetraethyl produced.

CHARLES A. KRAUS.
CONRAD C. CALLIS.